United States Patent
Hu et al.

(10) Patent No.: US 6,357,280 B1
(45) Date of Patent: Mar. 19, 2002

(54) LEAKAGE TESTING TOOL FOR A BELLOW OF A SEMICONDUCTOR MANUFACTURING MACHINE

(75) Inventors: Chih-Sheng Hu; Ze-You Lin; Lee-Forng Yen, all of Hsinchu (TW)

(73) Assignee: Winbond Electronics Corp. (TW)

( * ) Notice: Subject to any disclaimer, the term of this patent is extended or adjusted under 35 U.S.C. 154(b) by 0 days.

(21) Appl. No.: 09/587,999

(22) Filed: Jun. 6, 2000

(51) Int. Cl.[7] .......................... G01M 3/04; F16K 41/10
(52) U.S. Cl. .................. 73/40; 73/40.7; 73/46
(58) Field of Search ................ 73/40, 49, 40.7, 73/37, 46

(56) References Cited

U.S. PATENT DOCUMENTS

| | | | | |
|---|---|---|---|---|
| 3,583,239 A | * | 6/1971 | Paine ........................ | 73/49.8 |
| 4,540,019 A | * | 9/1985 | Owoc, et al. .............. | 137/557 |
| 4,773,256 A | * | 9/1988 | Saulgeot .................... | 73/40.7 |
| 4,779,449 A | * | 10/1988 | Bley et al. ................. | 73/40.7 |
| 4,813,268 A | * | 3/1989 | Helvey ....................... | 73/40.7 |
| 5,010,761 A | * | 4/1991 | Cohen et al. ............... | 73/40.7 |
| 5,251,471 A | * | 10/1993 | Minten ....................... | 73/40 |
| 5,267,468 A | * | 12/1993 | Zocoletti et al. ............ | 73/40 |
| 5,767,391 A | * | 6/1998 | Wong ......................... | 73/40.7 |
| 5,850,036 A | * | 12/1998 | Giromini et al. ............ | 73/40 |

* cited by examiner

Primary Examiner—Hezron Williams
Assistant Examiner—David J. Wiggins
(74) Attorney, Agent, or Firm—Jackson Walker L.L.P.

(57) ABSTRACT

The invention is a leakage testing tool for a bellow of a semiconductor manufacturing machine. The testing tool has a plate, a first rack and an opposite second rack, both racks formed on the plate and supporting the bellow. Two movable plates each engage with a respective one of two adjustment screws. Each adjustment screw can adjust a flat end of one of the movable plates to press on a respective one of two end flanges of the bellow. With the testing tool, whether a bellow is damages can be quickly and conveniently determined, whereby a significant low cost is achieved.

5 Claims, 8 Drawing Sheets

LEAKAGE TESTING TOOL FOR A BELLOW OF A SEMICONDUCTOR MANUFACTURING MACHINE

BACKGROUND OF THE INVENTION

1. Field of the Invention

The invention relates to a leakage testing tool for a bellow of a semiconductor manufacturing machine, especially to a testing tool which can quickly and conveniently determine if a bellow is damaged or not, and therefore can significantly achieve a low production cost.

2. Description of Related Art

Figure 4:
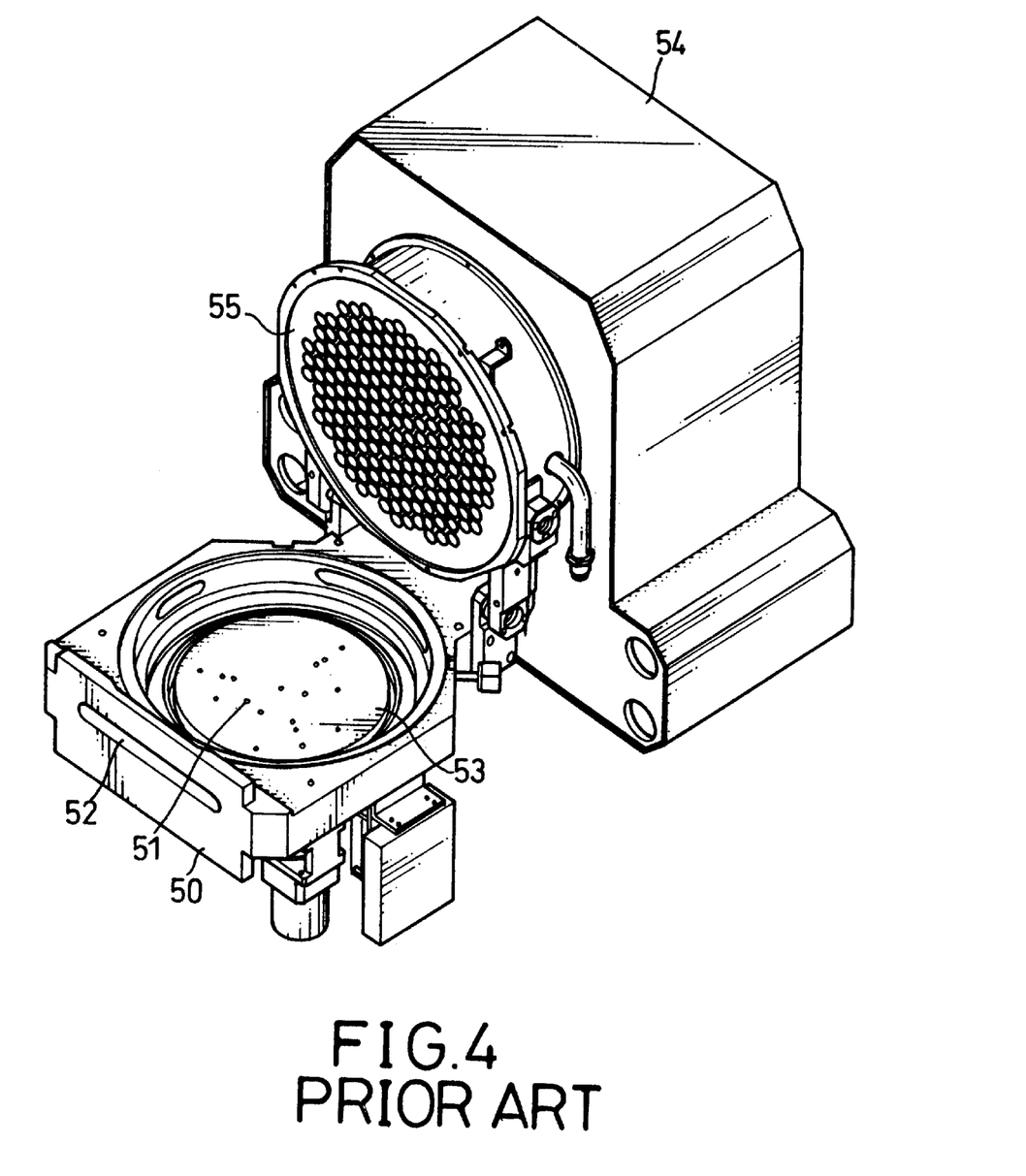
FIG. 4 is a perspective view of a conventional semiconductor manufacturing machine.

Bellows are used in semiconductor manufacturing machines for keeping chambers of the machines in vacuum. Shown in FIG. 4 is one kind of semiconductor manufacturing machine, a rapid thermal processor. It consists of a seat (50) and a cover (54) pivotally linked to the seat (50); the cover (54) is able to cover the seat (50) to form a chamber therebetween. The seat (50) has an inner disc (53) and a passage (52). A plurality of holes (51) are defined in the inner disc (53) for containing corresponding supporting needles (not shown in this FIG.). The cover (54) has a bulb group (55) which when the cover (54) is closed on to the seat (50), is just above the inner disc (53).

Figure 5:
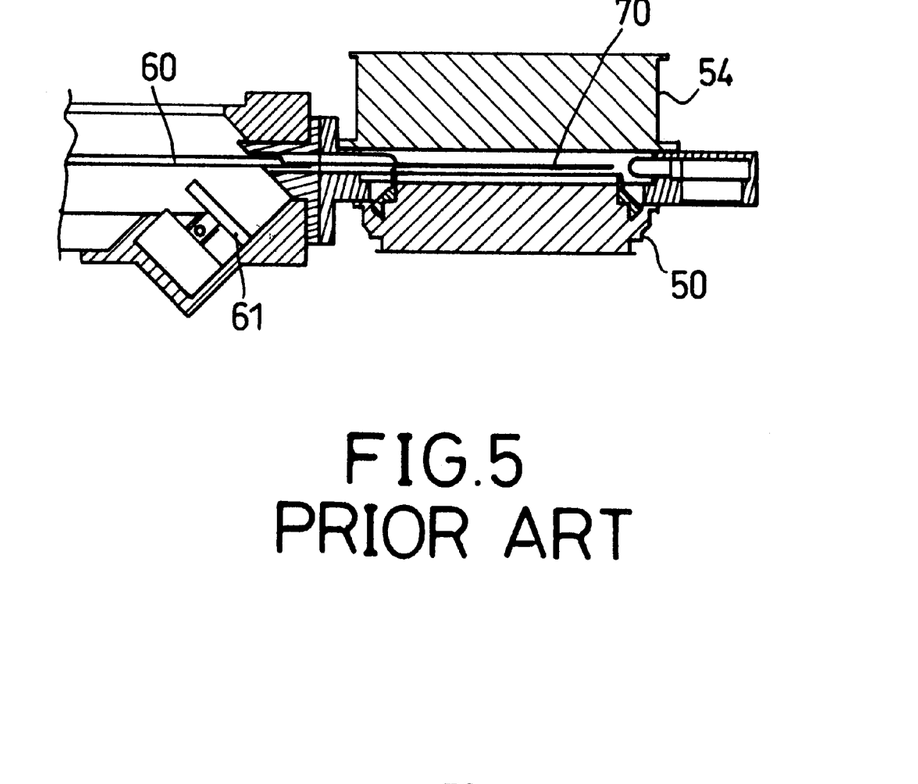
FIGS. 5 to 11 are cross-sectional views showing the operation of rapid thermal process; and, FIG. 12 is a cross-sectional view showing the configuration of the bellows and the semiconductor manufacturing machine.
Figure 6:
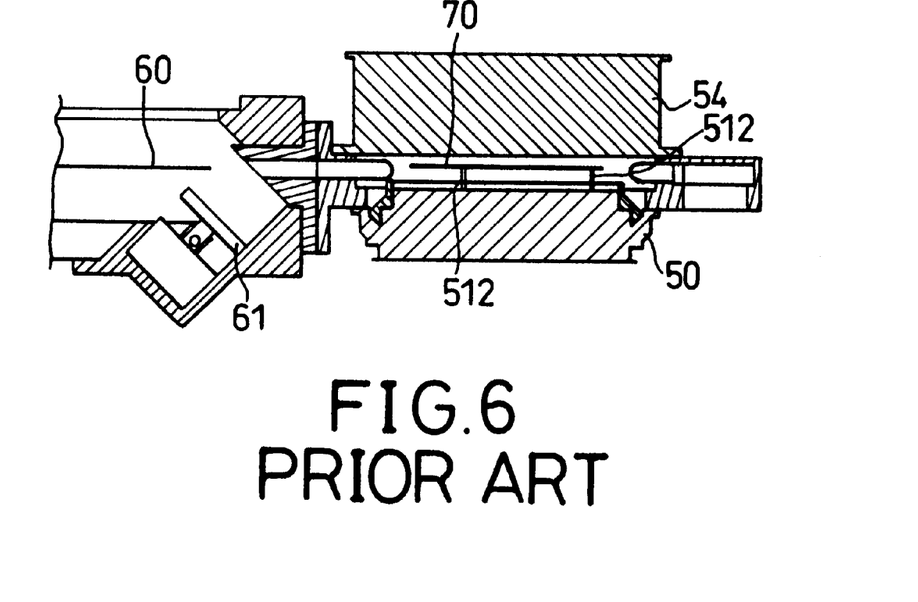
Figure 7:
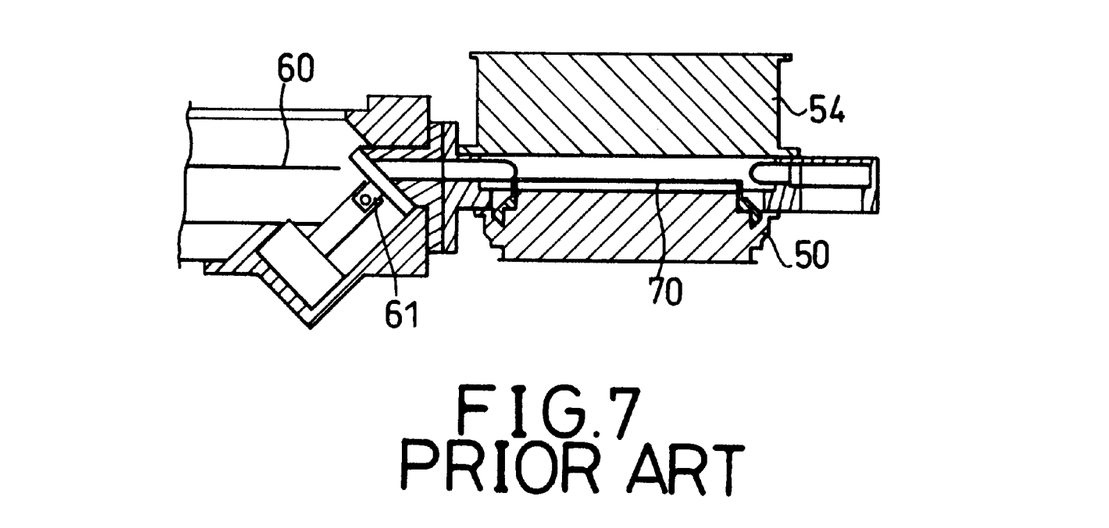
Figure 8:
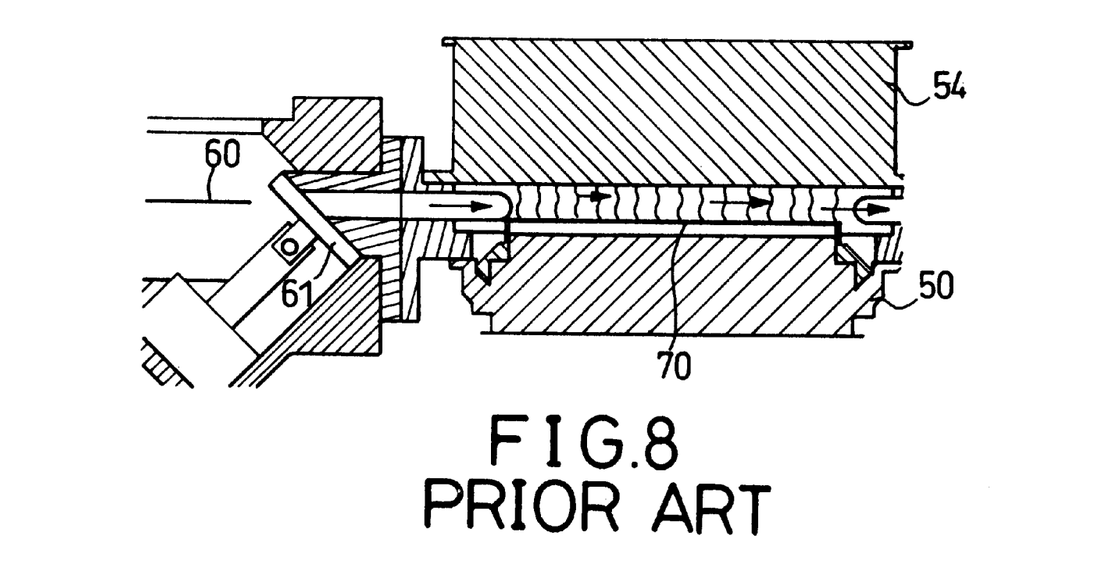
Figure 9:
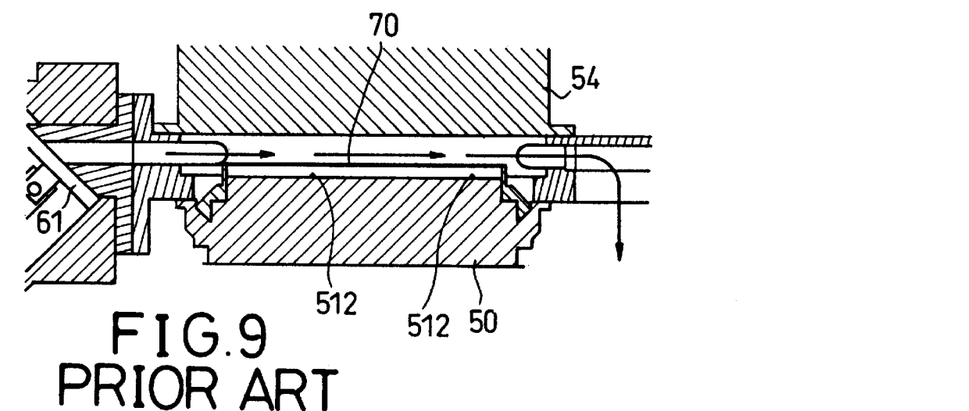
Figure 10:
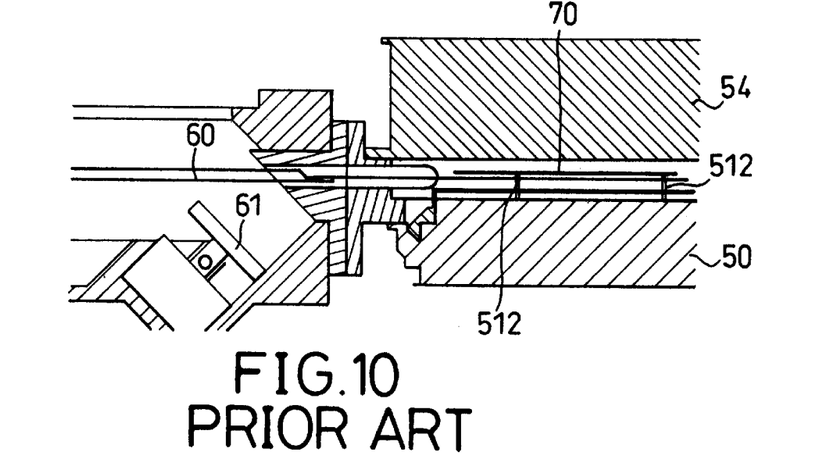
Figure 11:
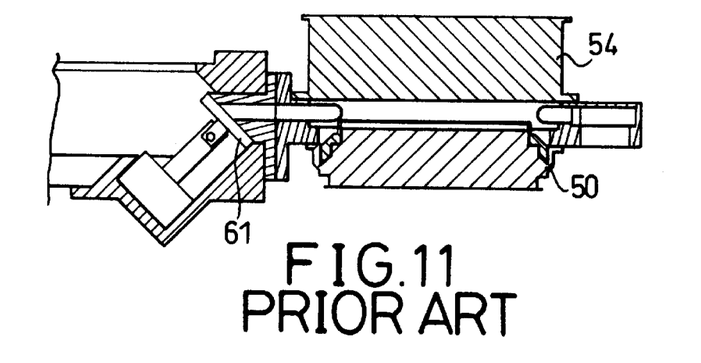

In production, as shown in FIG. 5 in which a conveyance tunnel is connected to a left side of the machine, a valve (61) provided in the tunnel is opened and a crystal unit (70) is put by a mechanical arm (60) through the passage (52) into the chamber. In FIG. 6, the supporting needles (512) are pushed to stick out from the inner disc (53) to support the crystal unit (70) and the mechanical arm (60) is drawn back. In FIG. 7, the valve (61) is closed. In FIG. 8, the rapid thermal processor is actuated. In FIG. 9, purge gas enters and flows through the processor. In FIG. 10, the valve (61) is opened again and the mechanical arm (60) is put into the chamber again. And finally in FIG. 11, the crystal unit is brought away by the mechanical arm (60) and the valve (61) is closed.

Figure 12:
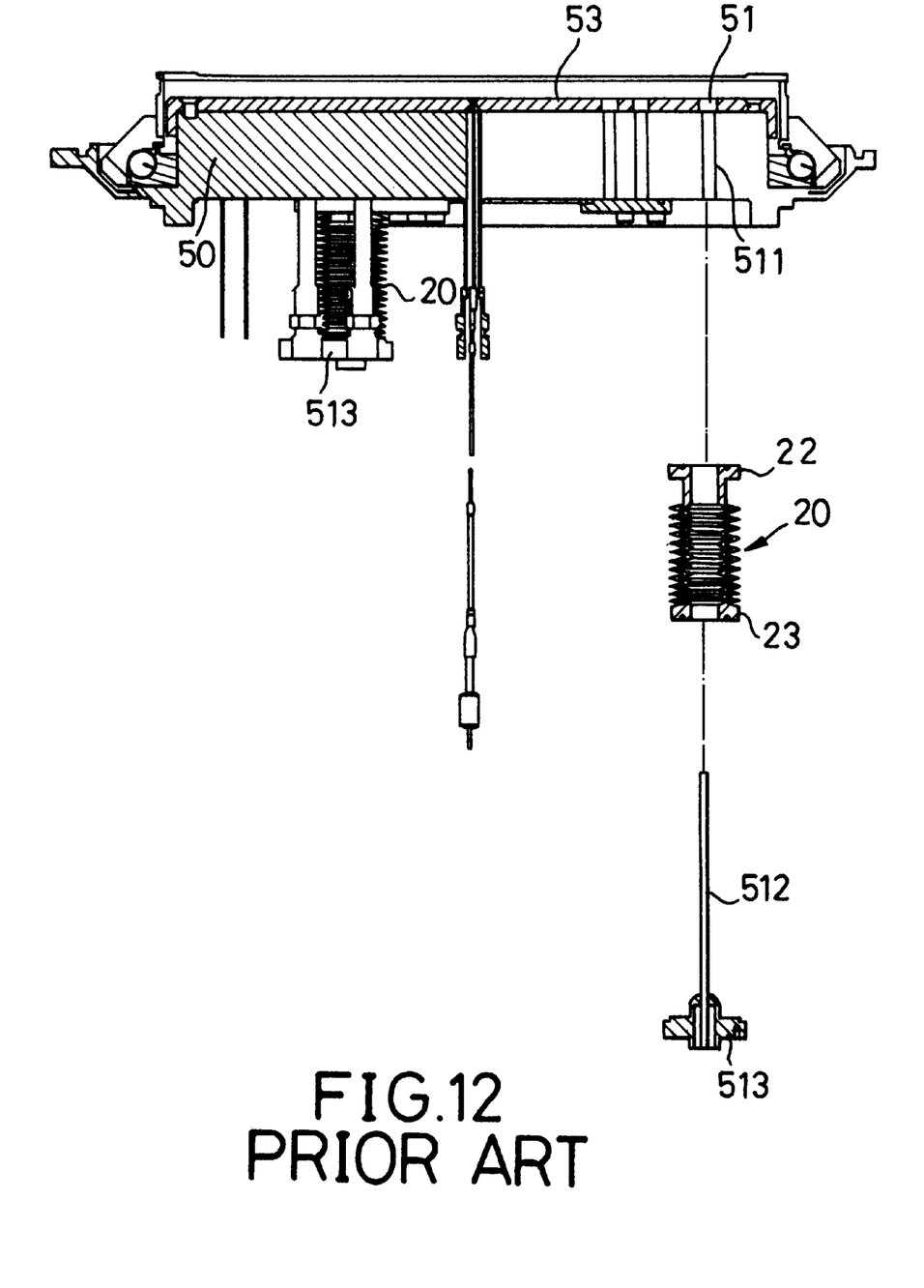

As described above, the supporting needles (512) should be pushed into the chamber and pulled back at least one time within one process. As shown in FIG. 12, each needle (512) is formed on a needle seat (513) and could be inserted through a channel (511) and the hole (51) defined in the inner disc (53). In order to prevent air leakage from the holes (51) and the channel (511), a bellow (20) is put round each needle (512) prior to the insertion. The bellow (20) has a top flange (22) and a bottom flange (23) which are able to respectively press on a bottom surface of the inner disc (53) and a top surface of the needle seat (513), and which, by assistance from two seal rings provided on top of each flange (22, 23), can keep the vacuum in the chamber.

In production, the bellows (20) are very liable to be damaged because of frequent movement. About two bellows (20) will be destroyed in one machine within one year. In a conventional test, two leakage tests, wherein all the needles (512) are pushed up and when all needles (512) are pulled back, are respectively conducted and then the results are compared. If the difference between the two results is greater than a standard one, it is deemed a leakage occurred and then all the bellows (512) must be changed.

SUMMARY OF THE INVENTION

The main objective of the invention is to provide a leakage test tool which can quickly and conveniently determine if a bellow is damaged or not, and therefore can achieve a significant low production cost. To obtain the above objective, a leakage testing tool for a bellow of a semiconductor manufacturing machine is provided to have a base, a first rack and a second rack opposite the first rack. Both racks are formed on the base and each of the racks have a recess defined to receive a bellow defining a central bore. The tool further comprises two opposite ears formed on the base respectively outside of the first and the second rack and each of the ears defining a threaded hole. Two adjustment screws are respectively threaded in said threaded holes of the ears. The tool also has a first and a second movable plates each having a flat end face urging against a respective one of two end flanges of the bellow, and each being able to engage with an adjustment screw. A tube is formed on a side wall of the first movable plate. One end of the tube is hermetically connected to a leakage detector and another end of the tube is in communication with a hole defined in the first movable plate which is in communication with the central bore of the bellow, whereby when the combined bellow and leakage testing tool are disposed in an airtight chamber which is then charged with a gas, a hermetic quality of the bellow is determinable.

Other objects, advantages and novel features of the invention will become more apparent from the following detailed description when taken in conjunction with the accompanying drawings.

DETAILED DESCRIPTION OF PREFERRED EMBODIMENT

Figure 1:
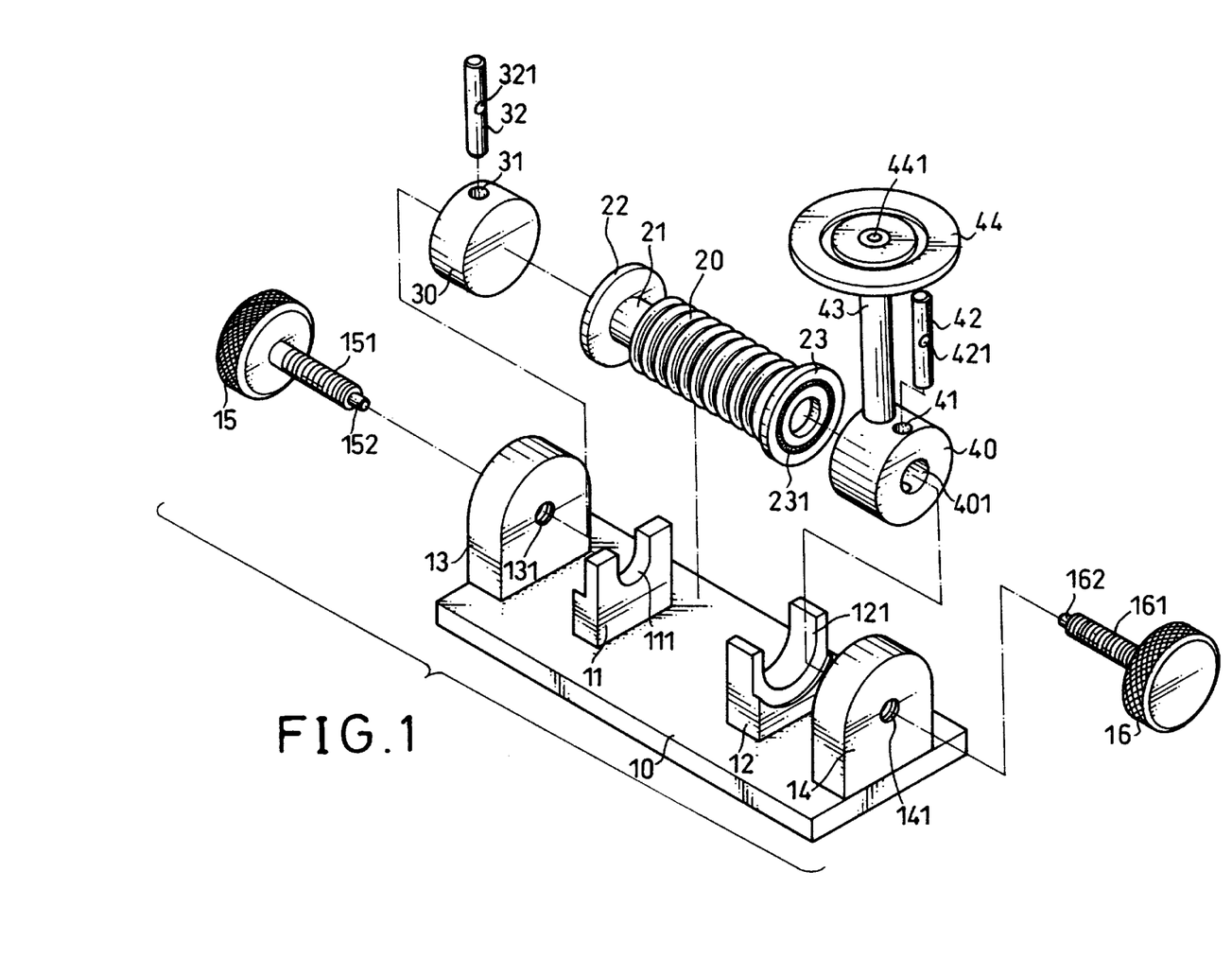
FIG. 1 is an exploded perspective view of the invention.
Figure 2:
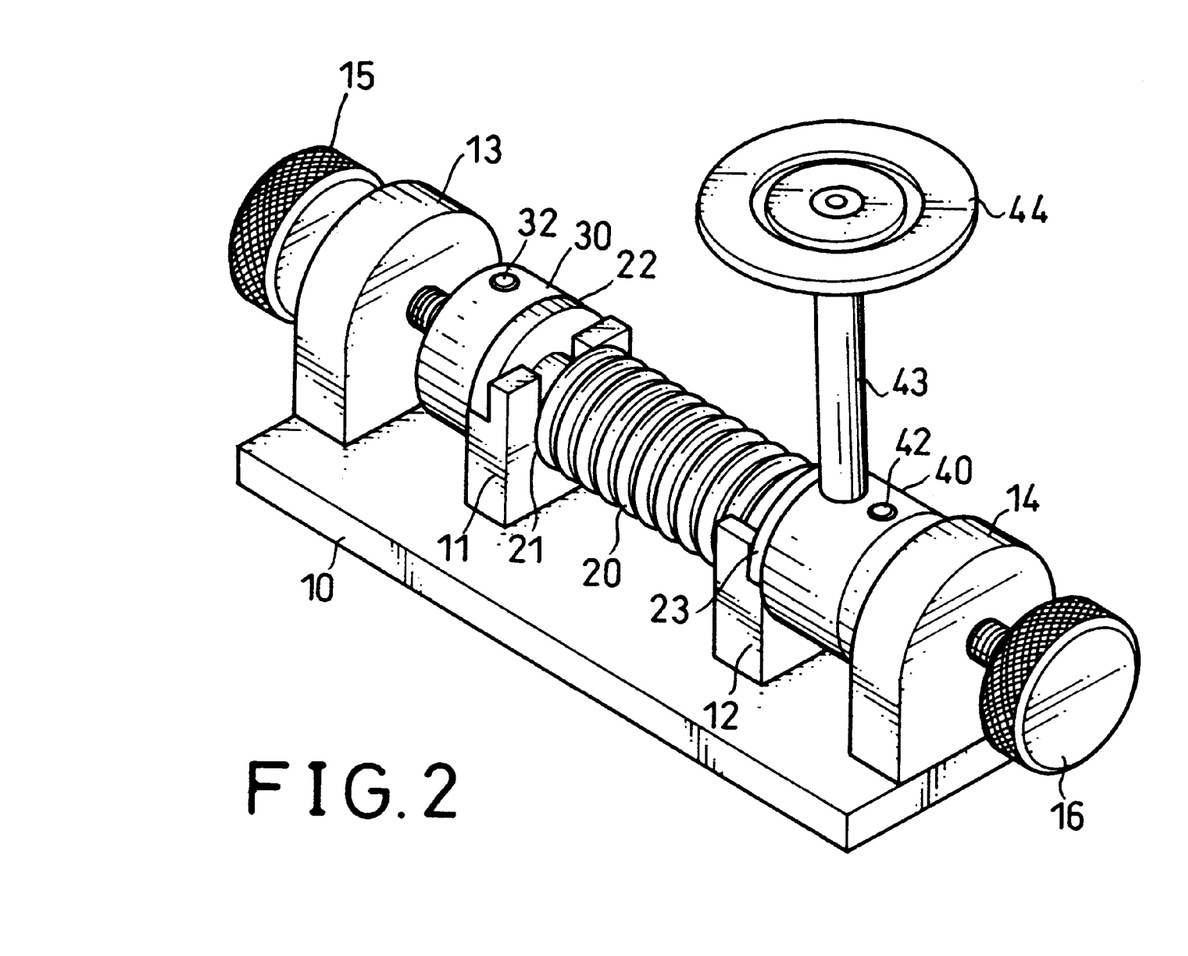
FIG. 2 is a perspective view of the invention when it is assembled.
Figure 3:
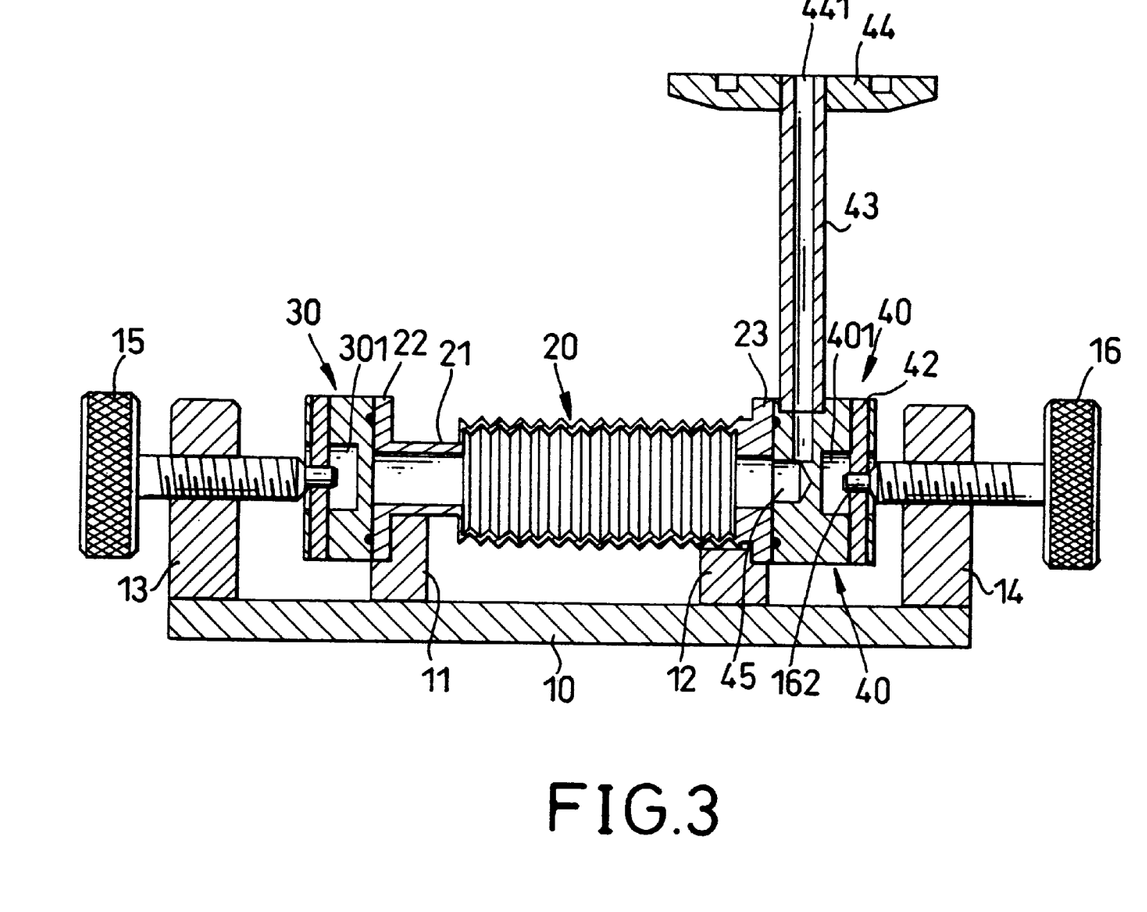
FIG. 3 is a cross-sectional view of the invention.

FIGS. 1, 2, and 3 respectively show an exploded, an assembled, and a cross-sectional view of the invention, a leakage testing tool for bellows.

The tool consists of a seat (10), a bellow (20), and a pair of movable plates (30, 40).

The bellow (20) has a stretchable tube-like body which has two flanges (22, 23) formed at respective ends thereof and which each define an "O" ring groove. Two "O" rings (231) are respectively received in the "O" ring grooves. The flange (22) is connected to the body by a neck (21).

The seat (10) has a base and a first rack (11) and a second rack (12) formed on the base. A recess (111) is defined in the first rack (11) for engaging with the neck (21) of the bellow (20); another recess (121) is defined in the second rack (12) for engaging with the body of the bellow (20) near the flange (23). As more clearly shown in FIG. 3, each rack (11,12) has an outer step sized to receive the respective one of the flanges (22,23). Two opposite ears (13, 14) are formed on the base outside each rack (11,12). Two threaded holes (131, 141) are respectively defined in the ears (13, 14). Each of two adjustment screws (15, 16) has a threaded shaft (151, 161) and a protrusion (152,162) formed on a distal end of the shaft (151,161). Each protrusion (152, 162) has a diameter smaller than that of the threaded shaft (151,161). The threaded shafts (151,161) are respectively threaded through the threaded holes (131, 141).

Each movable plate (30, 40) has an outer end recess (301/401), the function of which will be described hereinafter, and a cross-hole (31/41) which is able to receive a bar (32/42) therein. A central side opening (321/421) is defined in each bar (32/42). A hole (45) is defined in the movable plate (40) in an inner end thereof. The hole (45) is in communication with a central hole (441) of a tube (43) formed on a side wall of the movable plate (40). A connector (44) is formed on the tube (43).

In assembly, the two bars (32, 42) are respectively inserted into the cross-holes (31, 41) with the two central side openings (321, 421) thereof aligned with longitudinal center lines of the threaded holes (131,141). Then the two adjustment screws (15, 16) are respectively threaded in the two threaded holes (131, 141) until the protrusions (152, 162) thereof are inserted in the central side openings (321, 421) of the two bars (32, 42).

In testing, a bellow (20) is put onto the racks (11, 12) and the two adjustment screws (15, 16) are rotated in the threaded holes (131, 141) so that the screws (15, 16) move towards each other. As the threaded shafts (151/161) are turned the protrusions (152, 162) urge against the respective bar (32/42), thus the movable plates (30/40) are accordingly urged inward until the movable plates (30, 40) respectively and tightly press on the two flanges (22, 23) of the bellow (20). The "O" rings (231) provide hermetic seals between the flanges (22, 23) and the movable plates (30, 40). The connector (44) is connected to a Helium detector and a vacuum pump (not shown in FIG.). Finally Helium is charged into a sealed space in which at least one leakage testing tool of the invention is put, and at the same time, the Helium detector and the vacuum pump are activated. If the Helium detector determines that there is an existence of excess Helium, it proves that the bellow is damaged. If the Helium detector does trace Helium, it means the bellow is in a good condition.

Situations before and after the leakage test tool of the invention is employed are listed and compared in a table below:

ment of parts within the principles of the invention to the full extent indicated by the broad general meaning of the terms in which the appended claims are expressed.

What is claimed is:

1. A leakage testing tool for checking a bellow of a semiconductor manufacturing machine wherein the leakage testing tool is connected to a function toward checking hermetic quality of a tested bellows, the leakage testing tool comprising:

a base; a first support rack and a second support rack opposite the first rack, both first and second support racks formed on the base and each of the first and second support racks having an annular recess which can engage with a bellow defining a central bore;

two opposite support ears also formed on the base respectively outside of the first and the second support rack, and each of the support ears defining a threaded hole;

two adjustment screws respectively threaded in said threaded holes;

a first and a second movable plate, each of the first and second movable plates having a flat end face urging against a respective one of two end flanges of the bellow, and each of the first and second movable plates being able to engage with an adjustment screw; and a tube formed on a side wall of the first movable plate, one end thereof hermetically connected to a leakage detector and another end thereof in communication with a hole defined in the first movable plate which is in communication with the central bore of the bellow, whereby when the combined bellow and leakage testing tool are disposed in an airtight chamber which is then charged with a gas, a hermetic quality of the bellow is determinable by use of the leakage detector.

2. The leakage testing tool for a bellow of a semiconductor manufacturing machine as claimed in claim 1, wherein each screw has a protrusion formed on an end thereof, a diameter of each protrusion being smaller than a diameter of a shaft of the respective screw.

3. The leakage testing tool for a bellow of a semiconductor manufacturing machine as claimed in claim 1 wherein each of the first and second support racks defines an outer step sized to receive therein the respective flange of the bellow.

4. The leakage testing tool for a bellow of a semiconductor manufacturing machine as claimed in claim 1 wherein

|  | Quantity of chambers | Quantity of bellows | Bellows damaged per year | Bellows needing to be changed | Unit price of the bellow (yuan/bellow) | Yearly cost of bellows | Yearly savings on bellows |
|---|---|---|---|---|---|---|---|
| Before | 28 | 28 × 3 = 84 | 2 | 28 × 3 × 2 = 168 | 44911 | 168 × 44911 = 7,545,048 | / |
| After | 28 | 28 × 3 = 84 | 2 | 28 × 2 = 56 | 44911 | 56 × 44911 = 2,515,016 | 5,030,032 |

From the above description and table, it could be understood that the leakage testing tool of the invention is not only simple and convenient in operation, but can save a significant amount in production when compared to the prior art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangeeach of the first and second movable plates defines a cross hole sized to contain therein a bar, each bar including a central side opening sized to contain therein the protrusion of the respective adjustment screw, whereby the bars can be pressed by the protrusion of the respective adjustment screw.

5. The leakage testing tool for a bellow of a semiconductor manufacturing device as claimed in claim 1, wherein the gas is Helium.

* * * * *